(12) United States Patent
Enyedy et al.

(10) Patent No.: US 9,227,263 B2
(45) Date of Patent: Jan. 5, 2016

(54) WELDER HAVING FEEDBACK CONTROL

(71) Applicant: Lincoln Global, Inc., City of Industry, CA (US)

(72) Inventors: Edward A. Enyedy, Eastlake, OH (US); William Delvon Wilder, Cleveland, NY (US); Douglas S. Perry, Flowery Branch, GA (US)

(73) Assignee: Lincoln Global, Inc., City of Industry, CA (US)

( * ) Notice: Subject to any disclaimer, the term of this patent is extended or adjusted under 35 U.S.C. 154(b) by 409 days.

(21) Appl. No.: 13/630,591

(22) Filed: Sep. 28, 2012

(65) Prior Publication Data

US 2014/0091066 A1 Apr. 3, 2014

(51) Int. Cl.
*B23K 9/16* (2006.01)
*B23K 9/095* (2006.01)
*B23K 9/32* (2006.01)

(52) U.S. Cl.
CPC ............... *B23K 9/0956* (2013.01); *B23K 9/164* (2013.01); *B23K 9/325* (2013.01)

(58) Field of Classification Search
USPC .......................... 219/74, 121.55, 132, 121.63
See application file for complete search history.

(56) References Cited

U.S. PATENT DOCUMENTS

| | | |
|---|---|---|
| 5,304,776 A | 4/1994 | Buerkel |
| 6,820,647 B1 | 11/2004 | Grecco et al. |
| 7,026,569 B2 | 4/2006 | Halvorsen |
| 2005/0224466 A1 | 10/2005 | Halvorsen |
| 2009/0008370 A1 | 1/2009 | Salsich et al. |
| 2010/0065131 A1* | 3/2010 | Grooms .................. 137/205 |
| 2010/0276398 A1 | 11/2010 | Halvorsen et al. |
| 2011/0284500 A1* | 11/2011 | Rappl et al. .................. 219/74 |

FOREIGN PATENT DOCUMENTS

| | | |
|---|---|---|
| JP | S5835071 A | 3/1983 |
| JP | S62176685 A | 8/1987 |
| JP | 2000343220 A | 12/2000 |
| WO | 2013068814 A1 | 5/2013 |

OTHER PUBLICATIONS

International Search Report & Written Opinion for corresponding application PCT/IB2013/002171 dated Mar. 21, 2014.
GTFM IV Gas Trubine Flow Monitor User's Manual, CTW Computer Weld Technology, Operation/Installation Manual, dated Oct. 18, 2000.
Spectrum 375 X-TREME and XT30 Torch, Miller Electric Mfg. Co., Owner's Manual, dated 2011.
Welding Power Source FPA 2020 AC/DC, Fronius, product flyer dated 2011.
Orbital Welding Facts, Fronius International GmbH, publication, dated 2010, pp. 17 & 21.
http://www.netwelding.com/Flow_Rate_Limiter.htm, Welding Gas Flow Rate Limiter, pages from WA Technology web site, dated as last modified Jan. 30, 2012.

(Continued)

*Primary Examiner* — Brian Jennison
(74) *Attorney, Agent, or Firm* — Hahn Loeser & Parks LLP (57) ABSTRACT

A method and apparatus for improving the flow control of a shielding gas in a welding unit is described which uses feedback from at least one of a mass flow controller, a pressure sensor and a valve position sensor to regulate shielding gas flow through a controller.

13 Claims, 7 Drawing Sheets

(56) References Cited

OTHER PUBLICATIONS http://www.thefabricator.com/article/consumables/selecting-the-correct-shielding-gas-and-gas-delivery-system, article by Bell, David, titled Selecting the correct shielding gas and gas delivery system, the Fabricator.com web site, dated Jan. 10, 2012.

http://www.netwelding.com/High_Pressure_Systems.htm, Why Mig Weldign Gas Pressures Are High, pages from WA Technology web site, dated as last modified Jan. 30, 2012.

http://www.alicatscientific.com/products/gas-flow-controller.php, Mass Flow Controller, Gas and Volumteric Flow Control Products, pages form Allicat Scientific web site, copyright date 2012.

Uttrachi, Gerald D., GMAW Shielding Gas Flow Control Systems, The Welding Journal, Apr. 22, 2007.

http://www.netwelding.com/Automatic_Flow_Control.htm, Automatic Flow Compensation, pages from WA Technology web site, dated as last modified Jan. 30, 2012.

http://www.netwelding.com/Simple_Orifices_Don't_Work.htm, Simple Orifices, pages from WA Technology web site, dated as last modified Jan. 30, 2012.

Uttrachi, Jerry, MIG Shielding Gas Control and Optimization (Or—Everything You Didn't Know You Needed to Ask About MIG Shielding Gas Control!), WA Technology publication, dated Jul. 2011.

Alicat Scientific Operating Manual, Precision Gas Mass Flow Controllers, dated May 19, 2011, p. 36.

* cited by examiner

WELDER HAVING FEEDBACK CONTROL

TECHNICAL FIELD

The present invention relates to an improved gas flow controller for arc welding and cutting; and more specifically relates to an arc welder having improved gas control.

BACKGROUND OF THE INVENTION

Welding operations often employ the use of inert or semi-inert gases, e.g., helium, argon, carbon dioxide, etc., as a shielding gas to protect the weld area. Air in the weld zone is displaced by a shielding gas in order to prevent contamination of the molten weld puddle. This contamination is caused mainly by nitrogen, oxygen and water vapor present in the atmosphere. As an example, nitrogen in solidified steel reduces the ductility and impact strength of the weld and can cause cracking. In large amounts, nitrogen can also cause weld porosity. Excess oxygen in steel combines with carbon to form carbon monoxide (CO). This gas can be trapped in the metal, causing porosity. In addition, excess oxygen can combine with other elements in steel and form compounds that produce inclusions in the weld metal. When hydrogen, present in water vapor and oil, combines with either iron or aluminum, porosity will result and "underbead" weld metal cracking may occur. Argon, helium and carbon dioxide can be used alone, in combinations or mixed with other gases to provide defect free welds in a variety of weld applications and weld processes.

Metal Inert Gas ("MIG") welding is negatively impacted by excess shielding gas flow rate, and requires minimizing turbulent gas flow to exclude air from the arc. Several devices are used to set shielding gas flow rates. One is used on the cylinder or pipeline gas supply, e.g., a flowmeter with a flow control knob. The knob adjusts a needle valve that lowers the pressure in the gas delivery hose to that needed to achieve the desired flow of shielding gas, typically employing a float ball. Another is only for cylinder gas supply, and employs a very small orifice and varies the pressure upstream of the orifice using a regulator to control flow.

It is important that the flow rate set on the flowmeter or regulator remain at the set value while welding. However, restrictions occur in production which alter flow such as spatter build-up in the MIG gun nozzle, twists occurring in the gas passages in the MIG gun cable, or debris build-up in the conduit passage sections. In an effort to minimize the above variations, choked flow systems were developed. These systems required higher pressure upstream of the restriction of the orifice or valve. However, high pressure causes an initial gas surge, which is undesirable toward achieving high quality welds. In fact, excessively high gas surges at the start of the welding process allows air to be mixed with the gas stream and can cause internal weld porosity until steady state is achieved.

Low-pressure devices equally suffer from problems. These systems typically lack the automatic flow compensation of high pressure devices, and insufficient extra gas at the start of the welding operation causes inferior weld starts.

Overflow as well as underflow from the gas line to the welding torch causes initial weld irregularities, including spatter, porosity, and contamination of the weld. Therefore, it is desired to reduce and/or minimize the variation of shielding gas flow.

Finally, different brands of welding guns and different locations may have different flow characteristics that may further affect the flow of gas. Pressure or volume-based flow controllers do not have means for determining the flow rate that actually passes to the weld site, and therefore variations in flow from a gas source or through the weld gun will not be captured by the flow controller. Therefore, there is recognized a need for an improved gas flow controller that is capable of regulating the flow of a shielding gas to a welding operation, particularly during start-up.

SUMMARY OF THE INVENTION

The invention relates to a welding system which includes at least a shielding gas input; a shielding gas output coupled to a welding gun having a trigger; and a feedback control system for at least the shielding gas in which the shielding gas feedback control system includes a mass flow sensor for measuring flow between the shielding gas input and shielding gas output; a valve for regulating flow between the shielding gas input and shielding gas output; and a controller for communicating a valve position output to the valve based on input received from the flow sensor.

In one aspect of the invention, the control system will include a valve position sensor, which communicates a valve position to said controller which adjusts the valve based on valve position feedback. The feedback control system may optionally further include a pressure sensor for determining the pressure of the flow and communicating this information to the controller.

The feedback control system analyzes signals from at least two of sensors selected from the group consisting of the flow sensor, the pressure sensor, and the valve position sensor and adjusts said shielding gas output based on at least two signals. In another aspect of the invention, the control system will analyze signals from all three sensors.

In another aspect of the invention, a method is described of providing a targeted shielding gas flow rate to a weld site, the weld site comprising a gas input, an electrical input, a wire feeder, a welding gun and a feedback control system for regulating the flow of gas from the gas input to the welding gun, the feedback control system including at least a valve for controlling a shielding gas flow rate to the welding gun, a mass flow sensor for determining the rate of gas flow to the gun, and a controller for receiving a flow rate signal from the flow sensor and communicating a valve signal to the valve, comprising the steps of: communicating the flow rate of the shielding gas after the valve to the controller; determining a flow rate signal based on the flow rate of the shielding gas; comparing the flow rate to the targeted flow rate; calculating the valve signal; providing the valve signal to the valve; and adjusting the shielding gas flow rate through the valve based on the valve signal.

The method may optionally include the step of monitoring a feed gas input pressure, the monitoring generating a pressure signal for communication to the controller and wherein the process may further include a subsequent step of calculating the valve signal from analysis of the flow rate and pressure signals.

The method may further optionally include the step of monitoring a valve position and communicating that position signal to the controller.

In one aspect of the invention, the mass flow sensor is positioned adjacent or within the welding gun.

The invention extends to the components of the shielding gas flow control feedback system in which the system includes at least a shielding gas metering valve, a mass flow sensor downstream of the metering valve, and a controller in communication with the mass flow sensor and metering valve which adjusts the metering valve based at least upon signals received from the mass flow sensor.

As described previously, the gas flow control feedback system may optionally include a pressure sensor upstream of the metering valve and in communication with the controller as well as a valve position sensor in communication with the controller.

BRIEF DESCRIPTION OF THE DRAWINGS

The invention may take physical form in certain parts and arrangements of parts, a preferred of which will be described in detail in the specification and illustrated in the accompanying drawings which form a part hereof, and wherein.

DETAILED DESCRIPTION OF THE INVENTION

Figure 1:
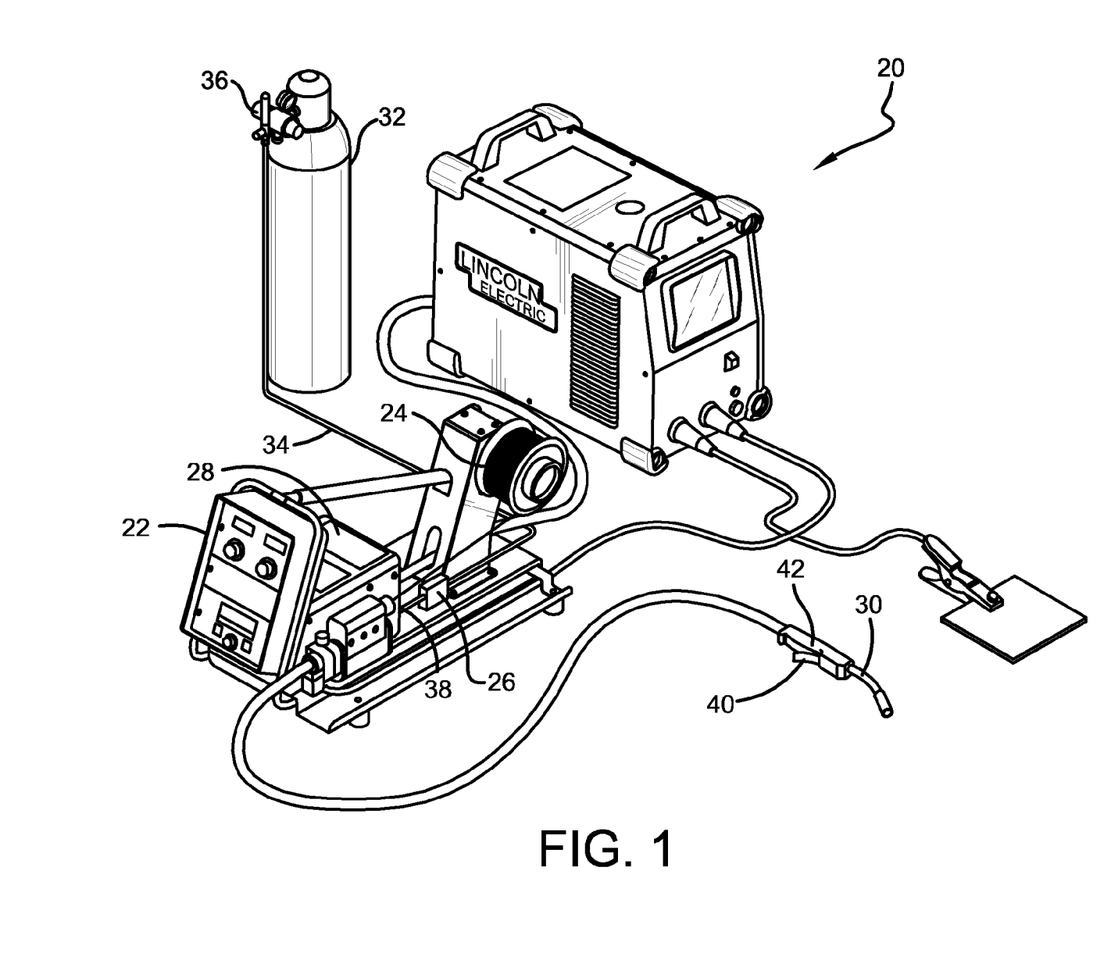
FIG. 1 is a schematic view of a welder having a shield gas supply.

The best mode for carrying out the invention will now be described for the purposes of illustrating the best mode known to the applicant at the time of the filing of this patent application. The examples and figures are illustrative only and not meant to limit the invention, which is measured by the scope and spirit of the claims. Referring now to the drawings, wherein the showings are for the purpose of illustrating an exemplary of the invention only and not for the purpose of limiting same, FIG. 1 illustrates a welding system 20 which includes welding user interface 22, wire feeder & spindle 24, gas flow rate controller 26, welding power supply 28 and gun 30. Shield gas is fed to gas flow rate controller 26 from gas supply 32, such as a gas line, gas-filled cylinder, or other pressurized supply. The shield gas is preferably selected from the group consisting of helium, nitrogen, argon, carbon dioxide, or other well known shielding gas, often having non-reactive properties for improving the quality of a weld. As illustrated in FIG. 1, gas flow rate controller 26 includes a variable flow control, such as an electrically actuated solenoid, that allows a user to select a preferred pressure or flow rate.

The shield gas is fed from gas supply 32 to flow rate controller 26 by means of feed hose or tube 34, which may be made of a flexible material, such as rubber, nylon or fiberglass-reinforced plastics, or rigid material, such as stainless steel or copper. Pressure regulator 36 is positioned between gas supply 32 and feed hose 34 for regulating the output pressure. In a preferred arrangement, pressure regulator 36 is directly coupled to gas supply 32 and is controllable between an "on" state where shield gas flows at a preferred pressure and an "off" state where no gas passes through pressure regulator 36.

As further referenced in the figure, gas torch line 38 extends from gas flow rate controller 26 to gun 30. Gas torch line 38 may be flexible or rigid. Gun 30 includes trigger 40 that optionally includes gas valve 42 and allows shield gas to flow through gun 30, thereby providing shielding gas to the weld site. In some arrangements, gas valve 42 of trigger 40 is an on/off switch, either allowing or disallowing flow through gun 30; while in other arrangements gas valve 42 is a variable valve, allowing variable amounts of shield gas to flow through gun 30 according to the degree of engagement of trigger 40.

Figure 2:
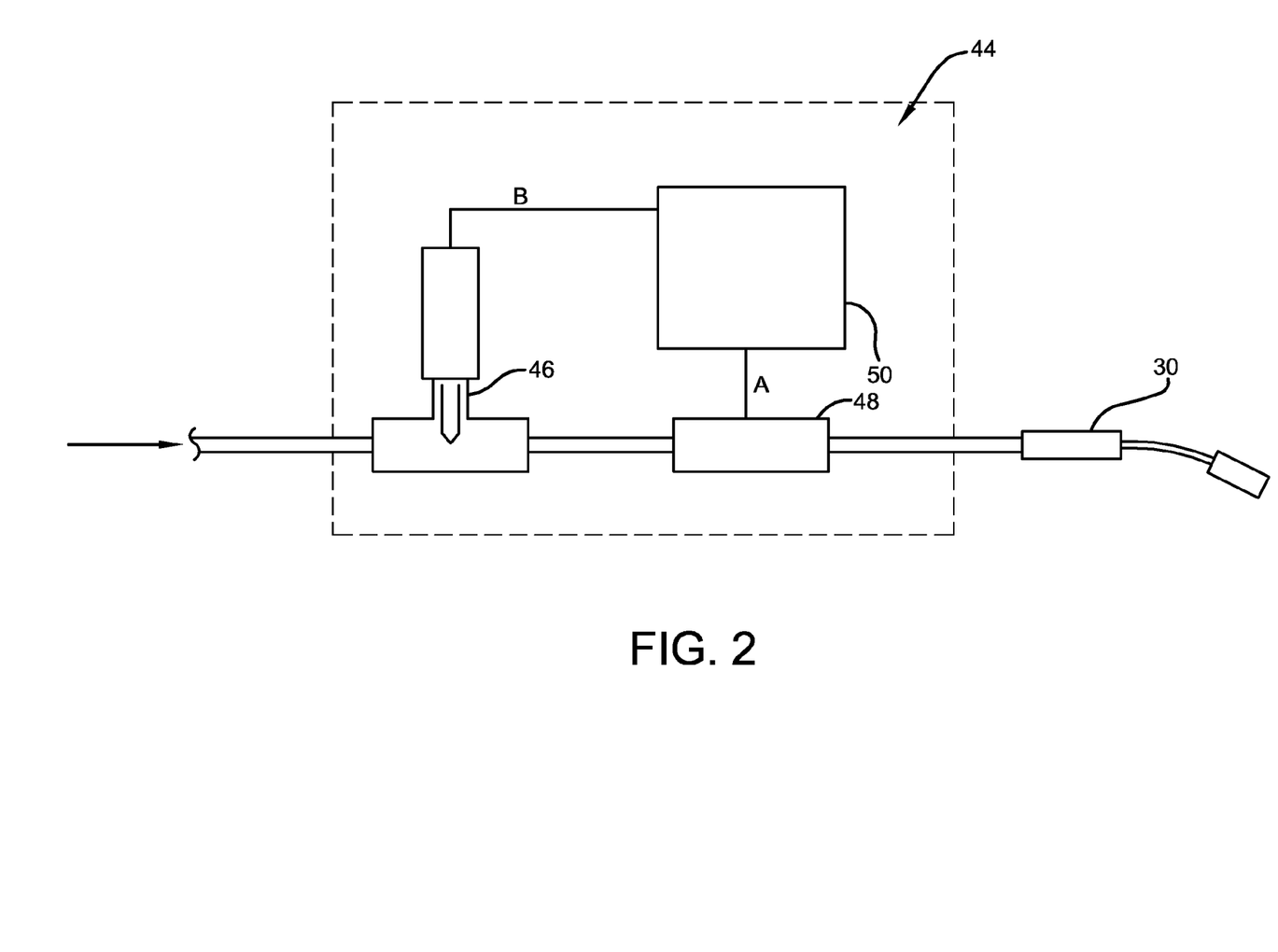
FIG. 2 is a schematic view of a gas feedback control system for the welder shown in FIG. 1.

FIG. 2 illustrates feedback control system 44 for accurately controlling the flow of gas from feed hose 34 to gun 30. In this arrangement, proportional valve 46, flow sensor 48, and controller 50 are provided in which flow sensor 48 detects the amount of shielding gas flowing from feed hose 34 to gun 30 and conveys this information to controller 50 which adjusts proportional valve 46 in order to increase or decrease the amount of flow depending upon a preset flow of shielding gas.

Flow sensor 48 measures either the volumetric flow rate or the mass flow rate of the shielding gas to gun 30. This information is digitized and transmitted to controller 50 through signal A. Controller 50 receives the flow rate of the shielding gas and determines whether this is above or below the preselected flow rate. If the flow rate is below the preselected flow rate, a high output signal is sent by flow signal B to proportional valve 46 and the flow rate is increased. If the flow rate is above the preselected flow rate, then a low output is sent by flow signal B to proportional valve 46 and the flow rate is decreased.

Flow sensor 48, according to a preferred arrangement, is a Coriolis mass flow sensor capable of outputting flow signal A, for example a digital electrical signal. Flow signal A may vary based on a wave frequency, voltage, current, or other variable signal. Alternatively, flow sensor 48 may sense pressure, flow rate, or other characteristic indicative of the amount of shielding gas flowing to gun 30.

Controller 50 is often a microprocessor capable of receiving flow signal A, which may be a digital or analog electrical input, comparing that input to a set state, and providing valve control signal B to the motorized valve. In this arrangement, the set state may be determined based on a user-selected value, such as from a user interface screen, or may be a preset constant value.

Figure 3:
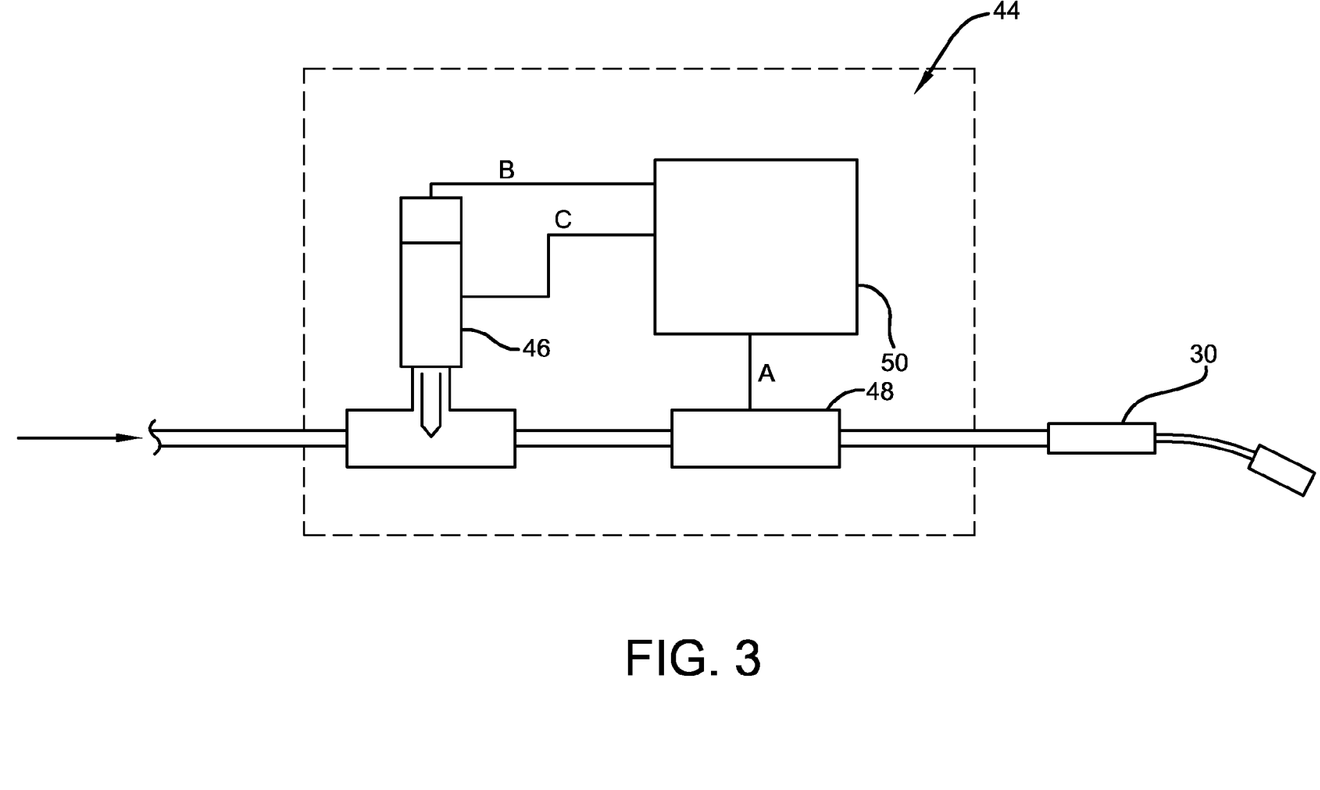
FIG. 3 is a schematic view of a gas feedback control system for the welder shown in FIG. 1.

As better illustrated in FIG. 3, feedback control system 44 includes proportional valve 46 which further includes valve position signal C that communicates the position of motorized valve 46 to controller 50. The arrangement shown in FIG. 2 requires controller 50 to calculate the position of valve 46 based on valve control signal B, which may not be accurate due to wear or inaccuracies in calculation or transmission. However, by providing valve position signal C from proportional valve 46 to controller 50, the position of proportional valve 46 is more accurately conveyed to controller 50. The expected position of the valve 46 now matches the actual position of valve 46. This arrangement allows for more accurate control over the flow through flow sensor 48 to gun 30.

Figure 4:
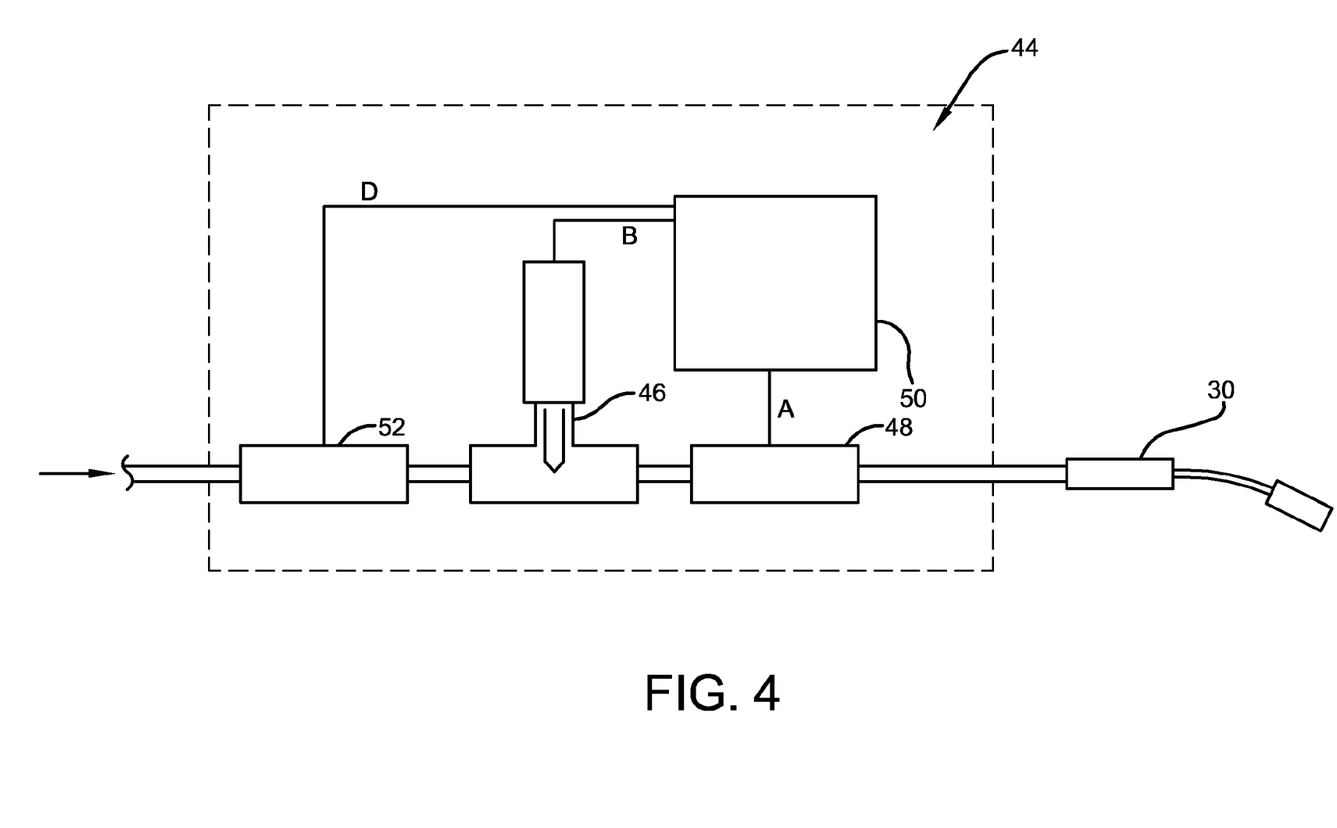
FIG. 4 is a schematic view of a gas feedback control system according to another variation.

As better illustrated in FIG. 4, feedback control system 44 valve position signal C is omitted and pressure sensor 52 is included upstream from motorized valve 46. Pressure sensor 52 includes pressure signal D that is transmitted from pressure sensor 52 to controller 50. Pressure sensor 52 is configured to detect line pressure of the shield gas and transmit that information through pressure signal D to controller 50 which uses this information to determine if a low flow condition, as indicated by flow signal A, is caused by low inlet pressure or by a restriction within the gun. For example, if flow signal A is low and pressure signal D is low, then the low flow condition is caused by a low inlet pressure. However, if flow signal A is low and pressure signal D is high, this indicates a blockage and controller 50 may output an error.

At least one advantage of communicating pressure signal D from pressure sensor 52 to controller 50 is that controller 50 may more accurately control the gain for adjusting valve 46. In one scenario, pressure signal D may report a high pressure and flow signal A may report a low flow. In order to prevent a sudden change in flow of shielding gas, controller 50 may command valve 46 to open slowly, allowing for a gradual change in line pressure and flow. However, if the pressure signal D is low and flow signal A is low, then controller 50 may command valve 46 to open quickly, allowing for a higher rate of increase in flow of the shielding gas.

Figure 5:
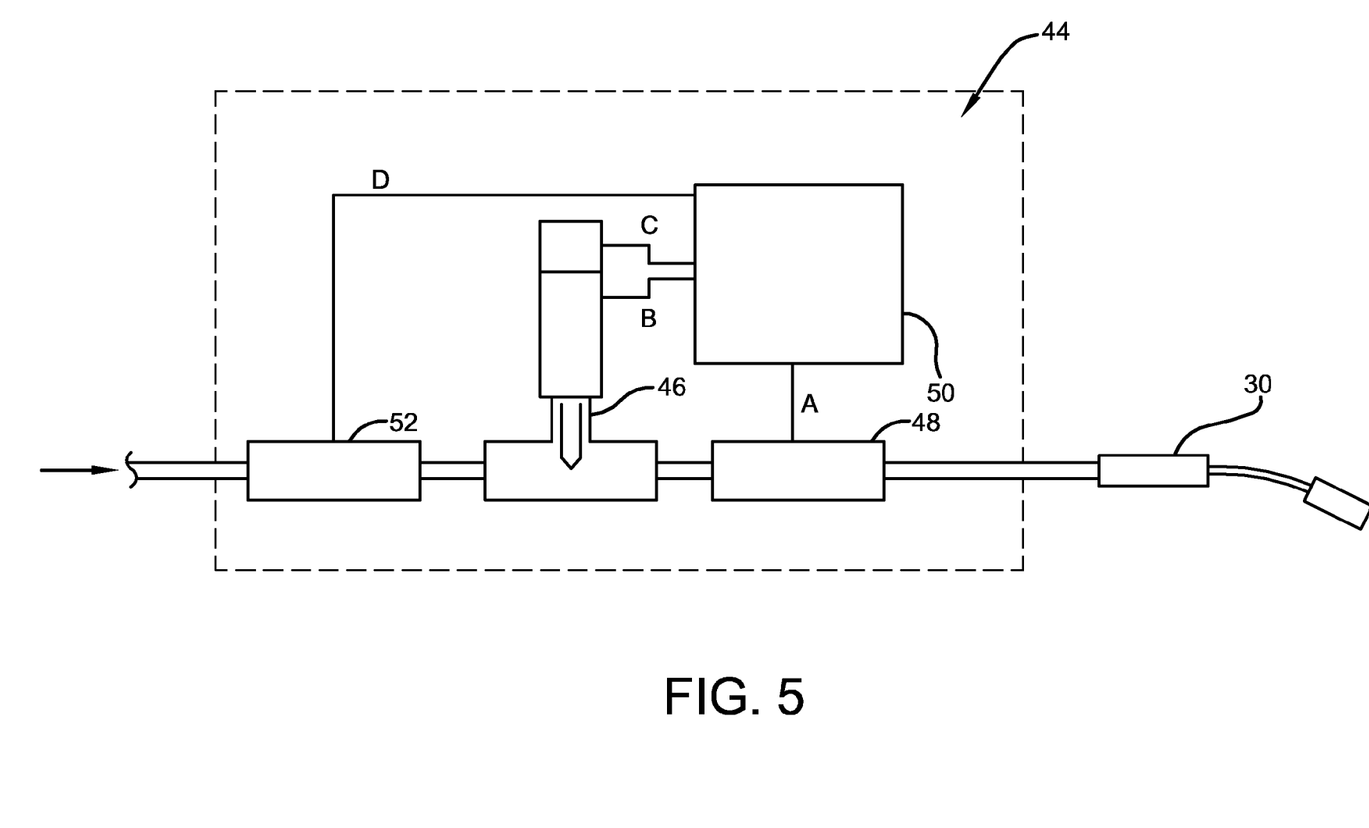
FIG. 5 is a schematic view of a gas feedback control system according to another variation.

As shown in FIG. 5, a more sophisticated feedback control system 44 includes proportional valve 46 for controlling shield gas flow to gun 30, flow sensor 48 for determining the amount of shield gas flow, controller 50 for adjusting valve 46, and pressure sensor 52 for determining the line pressure of the shield gas. Flow signal A communicates the amount of flow from flow sensor 48 to controller 50, valve control signal B allows controller 50 to adjust the position of valve 46, valve position signal C relays the position of valve 46 to controller 50 and pressure signal D communicates the line pressure from pressure sensor 52 to controller 50. This arrangement combines the advantages of the previous two arrangements described above.

Specifically, according to this arrangement controller 50 receives input concerning the pressure of the shielding gas (pressure signal D), the position of valve 46 (valve position signal C), and the amount of shield gas flowing to gun 30 (flow signal A). Controller 50 then uses this information to control valve 46 by transmitting an output through valve control signal C to valve 46. The various input signals to controller 50 require the controller to analyze a variety of situations and provide an output in valve control signal B.

Each of these input signals (flow signal A, valve position signal C, and pressure signal D) to controller 50 communicates a digital signal, such as a high voltage, a low voltage, or zero voltage, indicating that the value being measured is above, below, or at the preferred level. Similarly, any output communicated to valve 46 by valve control signal B is selectively an open, close, neutral signal. Controller 50 is capable of outputting valve control signal B as a high, low, or zero voltage, and may also include an option for outputting an error signal. If valve control signal B is high or low, then valve 46 will open or close, respectively. If the output is zero, then the valve will not change position. If the output is error, the valve may shut off completely or interpret the error output as an zero output, depending on the type of error. For example, if the pressure is too low to support the desired flow rate, the valve 46 may open to maximize flow; but if pressure signal D is high and flow rate signal A is low, there may be a blockage in the gun 30, requiring the valve 46 to close and avoid damage or non-quality welds. Alternatively, the signals may communicate an analog value.

Figure 6:
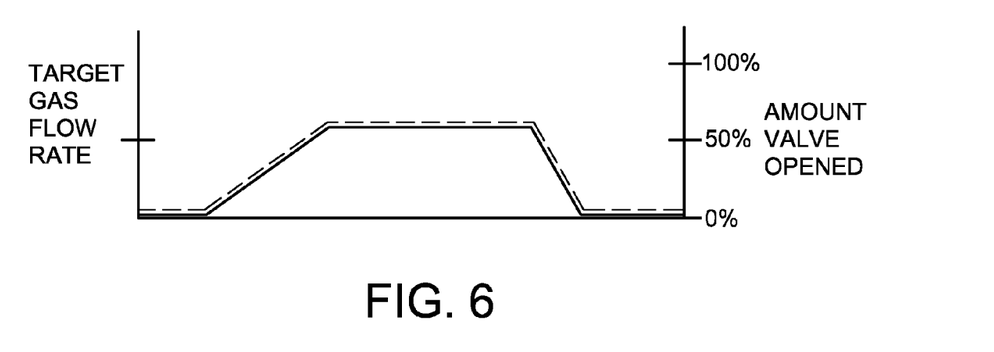
FIG. 6 is a graph illustrating ideal conditions for gas flow rate against time.
Figure 7:
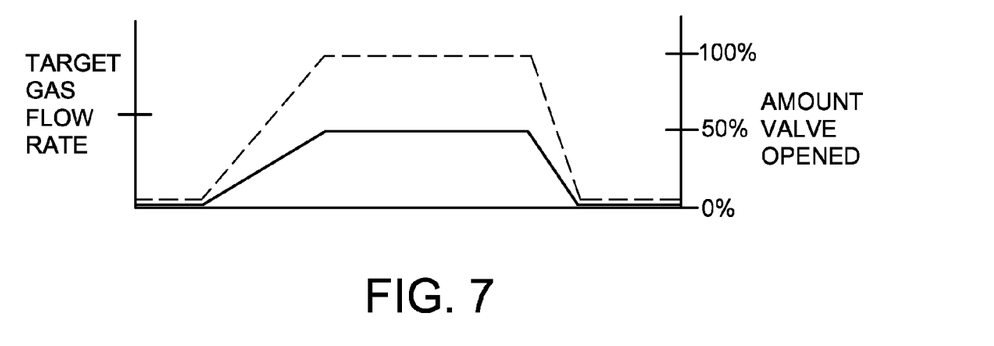
FIG. 7 is a graph illustrating gas flow rate for a blocked passage against time.
Figure 8:
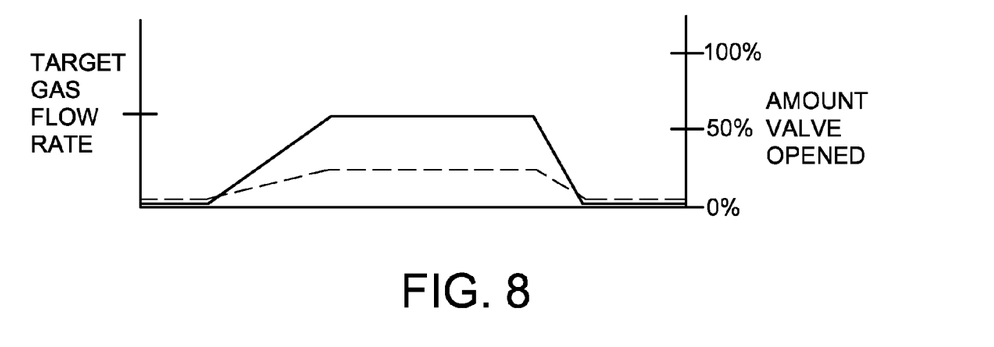
FIG. 8 is a graph illustrating gas flow rate for a high pressure situation against time.

Various graphs of gas flow rate and valve position are shown in FIGS. 6-8. In these graphs, the position of valve 46 are shown as a percentage from 0 to 100%, with a preferred operating range of about 50%. The left side of these graphs indicate the target gas flow rate while the right side indicates the amount valve 46 has been opened. In the ideal condition, shown in FIG. 6, valve 46 is opened at a steady rate and gas flow increases steadily. Once valve 46 reaches 50% and the target gas flow rate is achieved, valve 46 remains open until the weld is finished. The valve may close cleanly, reducing gas flow rate from the target flow rate to zero.

In FIG. 7, a blocked passage or gas shortage scenario is shown. In this scenario, valve 46 must be opened to 100% in order to achieve the desired gas flow rate. This required valve 46 to be opened at a faster rate to achieve the same time to maximize flow as in the ideal condition.

In FIG. 8, a high gas pressure scenario is shown. In this scenario, valve 46 is opened to a lower percent total flow, for example, about 25%. This requires a higher degree of control to avoid spikes in the flow rate.

Figure 9:
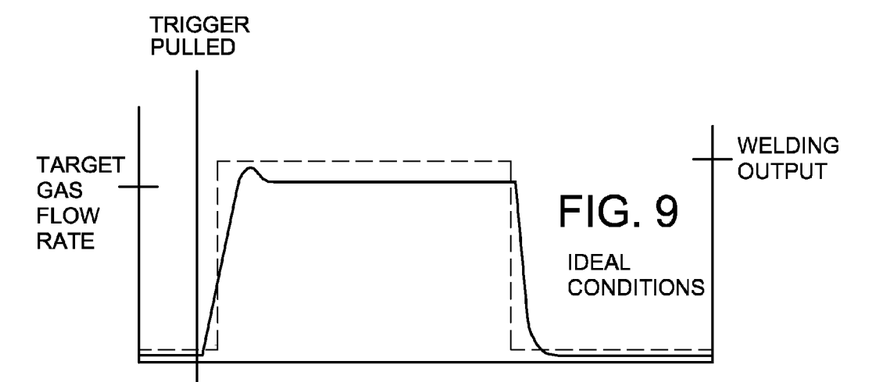
FIG. 9 is a graph illustrating an ideal gas flow rate against time.
Figure 10:
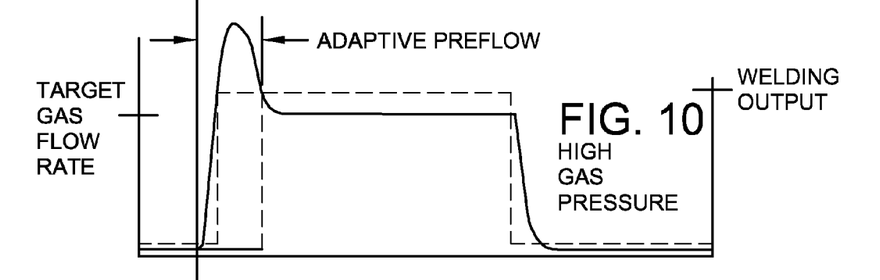
FIG. 10 is a graph illustrating gas flow rate for a high pressure situation against time.
Figure 11:
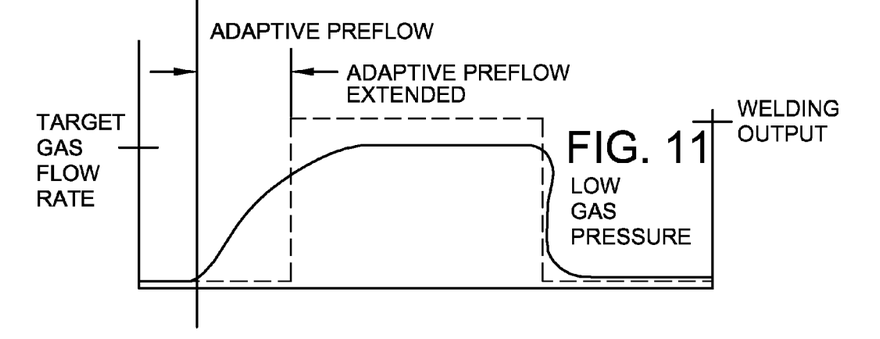
FIG. 11 is a graph illustrating gas flow rate for a low pressure situation against time.

FIGS. 9-11 show various scenarios demonstrating the gas flow and actual weld output as a function of time. The target gas flow rate is shown along the left side of the graph and the welding output is shown along the right side of the graph. Once trigger 40 on gun 30 is pulled, gas will flow through gun 30 to the output. In these figures various scenarios, namely ideal, high pressure and low pressure, demonstrate gas flow as a function of time after trigger 40 is engaged.

In FIG. 9, an ideal scenario is shown. According to this condition, once trigger 40 is pulled the gas flow rate will increase to a maximum slightly (approximately 5%) above the target gas flow rate. The gas flow rate will then decrease to the target gas flow rate, allowing for ideal weld output.

In FIG. 10, a high gas pressure scenario is shown. When trigger 40 is pulled, because of the high pressure, the gas flow rate will spike in an adaptive pre-flow condition before settling to the target gas flow rate. In this condition, controller 50 allows a brief spike in gas pressure in order to prevent fluctuation or slow build-up.

In FIG. 11, a low pressure scenario is shown. When trigger 40 is pulled, controller 50 will open the valve for a longer adaptive pre-flow time, increasing the flow rate until it reaches the target gas flow rate.

The best mode for carrying out the invention has been described for purposes of illustrating the best mode known to the applicant at the time. The examples are illustrative only and not meant to limit the invention, as measured by the scope and merit of the claims. The invention has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof.

What is claimed is:

1. A welding system comprising:
   a shielding gas input;
   a shielding gas output coupled to a welding gun having a trigger;
   a valve for regulating flow between said shielding gas input and said shielding gas output; and
   a feedback control system for at least said shielding gas comprising at least two sensors, one sensor being a valve position sensor and at least one second sensor selected from the group consisting of a mass flow sensor and a pressure sensor:
   said mass flow sensor for measuring flow between said shielding gas input and said shielding gas output;
   said pressure sensor for determining the pressure of the flow and communicating said pressure to said controller for adaptive preflow control;
   said valve position sensor for communicating a valve position to a controller based upon valve position output from a valve position sensor; and wherein said feedback control system analyzes signals from said valve position sensor and said at least one of said flow sensor and said pressure sensor to adjust said shielding gas output based on said at least two signals.

2. The welding system of claim 1 wherein
said controller interactively controls said valve position.

3. The welding system of claim 2 wherein
said controller includes an alarm for indicating when feedback from said valve position is different than said valve position output.

4. The welding system of claim 1 wherein
said feedback control system analyzes signals from all of said flow sensor, said pressure sensor, and said valve position sensor and adjusts said shielding gas output based on said three signals.

5. A method of providing a targeted shielding gas flow rate to a weld site, said weld site comprising a gas input, an electrical input, a wire feeder, a welding gun and a feedback control system for regulating the flow of gas from said gas input to said welding gun, said feedback control system comprising a valve for controlling a shielding gas flow rate to said welding gun, a valve position sensor for determining the position of a valve, at least one of a mass flow sensor for determining the rate of gas flow to said gun and a pressure sensor for determining the pressure of the flow, and a controller for receiving a flow rate signal from at least two of said sensors and communicating a valve signal to said valve, comprising the steps of:
communicating at least one of said flow rate of said shielding gas after said valve and said shielding gas pressure in addition to a valve position to said controller;
determining a flow rate signal based on at least one of said flow rate and said pressure of said shielding gas in addition to said valve position;
comparing said flow rate to said targeted flow rate;
calculating said valve signal;
providing said valve signal to said valve; and
adjusting at least one of said shielding gas flow rate and said pressure of said shielding gas in addition to said valve position through said valve based on said valve signal.

6. The method of claim 5 which further comprises the step of:
monitoring a shielding gas input pressure.

7. The method of claim 6 which further comprises the step of:
calculating said valve signal from analysis of said flow rate signal and said pressure signal for adaptive preflow control.

8. The method of claim 7 further comprising the step of:
rectifying said position signal with said valve signal by said controller.

9. The method of claim 5 wherein
said controller closes said valve when a trigger on said welding gun is not engaged.

10. The method of claim 5 wherein
said mass flow sensor is positioned adjacent or within said welding gun.

11. A shielding gas flow control feedback system for use in a welding unit comprising:
a shielding gas metering valve;
a mass flow sensor downstream of said metering valve; and
a controller in communication with said mass flow sensor and said metering valve which adjusts said metering valve based at least upon signals received from said mass flow sensor;
a pressure sensor upstream of said metering valve and in communication with said controller;
a valve position sensor in communication with said controller.

12. A welding system comprising:
a shielding gas input;
a shielding gas output coupled to a welding gun having a trigger; and
a feedback control system for at least said shielding gas comprising:
a mass flow sensor positioned within said welding gun for measuring flow between said shielding gas input and said shielding gas output;
a valve position sensor for communicating a valve position to a controller based upon valve position output from a valve position sensor;
a pressure sensor for determining the pressure of the flow and communicating said pressure to said controller for adaptive preflow control; and
a valve for regulating flow between said shielding gas input and said shielding gas output; and wherein
said controller interactively controls said valve position by analyzing signals from all of said flow sensor, said pressure sensor, and said valve position sensor and adjusts said shielding gas output based on said three signals.

13. The welding system of claim 12 wherein
said controller includes an alarm for indicating when feedback from said valve position is different than said valve position output.

* * * * *

UNITED STATES PATENT AND TRADEMARK OFFICE
CERTIFICATE OF CORRECTION

PATENT NO. : 9,227,263 B2  
APPLICATION NO. : 13/630591  
DATED : January 5, 2016  
INVENTOR(S) : Edward A. Enyedy, William Delvon Wilder and Douglas S. Perry It is certified that error appears in the above-identified patent and that said Letters Patent is hereby corrected as shown below:

In the Specification

In Col. 3, line 12, the word  
--embodiment-- should be added between the words: preferred, and of;

In Col. 3, line 47, the word  
--embodiment-- should be added between the words: exemplary, and of.

Signed and Sealed this  
Nineteenth Day of April, 2016

Michelle K. Lee  
*Director of the United States Patent and Trademark Office*